(12) United States Patent
Kuo et al.

(10) Patent No.: US 7,135,415 B2
(45) Date of Patent: Nov. 14, 2006

(54) INSULATED STRUCTURE OF A CHIP ARRAY COMPONENT AND FABRICATION METHOD OF THE SAME

(75) Inventors: Hsiao-Lin Kuo, Hsinchu (TW); Ching-Chien Chen, Hsinchu (TW); Kwo-Fang Ku, Taiping (TW); Yu-Chin Hsu, Hsinchu (TW)

(73) Assignee: Inpaq Technology Co., Ltd., Hsinchu (TW)

( * ) Notice: Subject to any disclaimer, the term of this patent is extended or adjusted under 35 U.S.C. 154(b) by 0 days.

(21) Appl. No.: 10/896,975

(22) Filed: Jul. 23, 2004

(65) Prior Publication Data

US 2006/0017179 A1 Jan. 26, 2006

(51) Int. Cl.
*H01L 21/31* (2006.01)
*H01L 21/469* (2006.01)
*H01L 21/26* (2006.01)

(52) U.S. Cl. ............ 438/759; 438/758; 438/329; 438/107; 438/E21.008

(58) Field of Classification Search ............... 257/730, 257/692, 723, 724, 690, 701; 438/107, 758, 438/759, 329; 29/25.42; 361/308.1
See application file for complete search history.

(56) References Cited

U.S. PATENT DOCUMENTS

| | | | | |
|---|---|---|---|---|
| 4,312,026 A | * | 1/1982 | Iwaya et al. | 361/321.1 |
| 5,493,769 A | * | 2/1996 | Sakai et al. | 29/593 |
| 5,888,884 A | * | 3/1999 | Wojnarowski | 438/462 |
| 6,576,999 B1 | * | 6/2003 | Sakai et al. | 257/730 |
| 2001/0030593 A1 | * | 10/2001 | Imada et al. | 336/200 |
| 2003/0005576 A1 | * | 1/2003 | Tsukada | 29/619 |

\* cited by examiner

*Primary Examiner*—Nitin Parekh
(74) *Attorney, Agent, or Firm*—Lowe Hauptman & Berner, LLP

(57) ABSTRACT

An insulated structure of a chip array component and fabrication method of the same, the element is fabricated by enclosing its main body with a dense layer of high surface insulation resistance material, and then exposing the portions of the main body where terminal electrodes are to be formed by removing the dense layer of high surface insulation resistance material by employing sand blasting, laser trimming, grinding, or etching process.

1 Claim, 7 Drawing Sheets

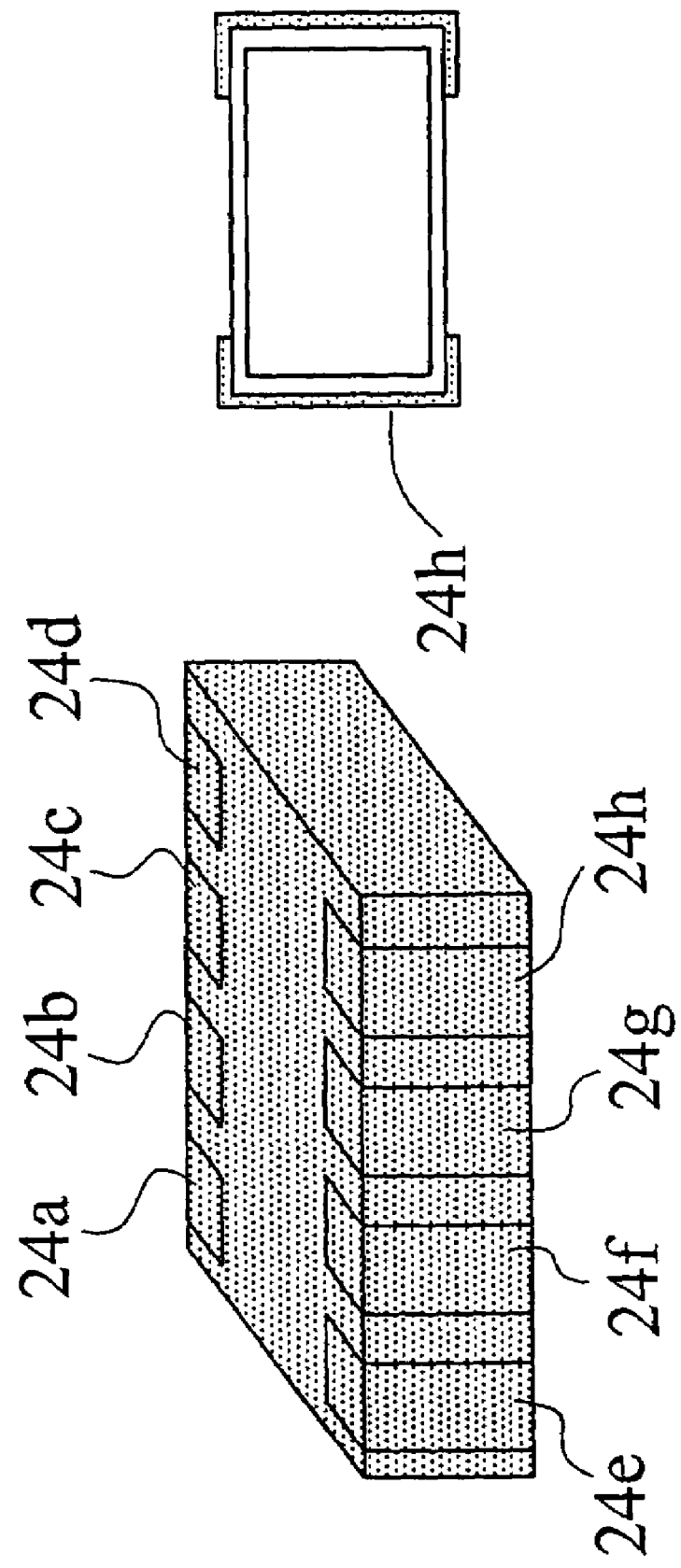

12# INSULATED STRUCTURE OF A CHIP ARRAY COMPONENT AND FABRICATION METHOD OF THE SAME

BACKGROUND OF THE INVENTION

1. Field of the Invention

The present invention relates to an insulated structure of a chip array component and fabrication method of the same. In particular, to a chip array component whose main body is entirely and densely coated with a high resistance insulation material and then by removing parts of the coating at the positions of the terminal electrodes using sand blasting, laser trimming, grinding or etching process, so as to obtain a desired finished structure of the chip array component.

2. Description of the Prior Art

The chip array component is widely applied as an important component in many electronic products. Different types of materials are applied to form a variety of electronic elements according to their respective physical properties. For example, the ceramic dielectric substance is a suitable material for forming the chip capacitor array component, the ceramic ferrite substance is a suitable material for forming the chip bead array component, and the ceramic semiconductor substance is suitable for forming the chip varistor array component. In the materials mentioned above, although a ceramic dielectric substance with good insulation property is selected for forming a chip arrayed type capacitor element, the insulation resistance of the capacitor element is still not reliable under high voltage applications. And the chip arrayed type bead element or varistor element etc. formed of material with a lower volume resistivity also has a problem of poor insulation resistance. Even there might arise a problematic insulation resistance appealing on the surface of an element during the fabrication process.

Furthermore, in a chip array component of insufficient surface insulation resistance, it is difficult to fabricate terminal electrodes with excellent soldering property. In order to rectify such a disadvantage, a very special means and process for forming terminal electrodes with definite soldering properties should be considered. However, these two conditions have the problems of manufacturing process or quality of the product.

FIGS. 1A and 1B are two perspective views of terminal electrode of a chip array component fabricated with a conventional method. On the main body of a component 10, terminal electrodes for the chip array component are formed directly at the positions 11a, 11b, 11c, 11d, 11e, 11f, 11g and 11h with an appropriate electrode material.

In the case an ordinary conducting material is used for forming the terminal electrodes, as shown in FIG. 1B, an electroplating process will be performed to form soldering interfaces 12a~12h at the positions on the terminal electrode conductor where the terminal electrodes 11a~11h are to be formed at the final stage of the chip array fabrication process.

In order to reliably soldering the terminal electrodes in the chip array component with an insufficient surface insulation resistance, the prior arts encounter the following problems:

1. It is an art of directly using a conducting material containing a precious metal component to form the terminal electrode so as to meet the requirement of soldering. However, to solve the soldering problems in this art is not only increasing the production cost due to selecting the expensive conductor for fabricating terminal electrodes. Moreover, the aforesaid conducting material is easy to deteriorate by oxidation and then causing the finished product to lose its reliability and degrade its quality comparing with the soldering interface.

2. Another art usually adopted by the prior fabrication process to overcome the above defect is to utilize a specially plating solution and plating process so as to grow a preferable soldering interface at the position where the terminal electrode is to be formed. However, such a particularly designed treating method is likely incompatible with a common chip array component resulting in vainly wasting the investment and increasing an extra work for waste disposal in a complicated tedious way, therefore, the quality of the product still remains unimproved.

As for the chip array capacitor for high voltage application, the above mentioned two defects become minor problems to be worried. But a granulated surface resulted by the ceramic material brings the problems of high voltage discharging and leakage current caused by the affixed dirts. For a remedy, a long term study and investigation as to develop an improved dielectric material to overcome this embarrassment is necessary.

For these defects noticeable on the prior art, an improvement is seriously required.

The inventor has dedicated great efforts for years in studying and improving these defects and finally come up with a novel insulated structure of a chip array component and its fabrication method as provided in this invention to eliminate the defects mentioned above.

SUMMARY OF THE INVENTION

It is an object of the present invention to provide an insulated structure of a chip array component in which a layer of a dense insulation material is entirely enclosed over the main body of the element before fabrication of terminal electrodes so as to increase the surface insulation thereof and smooth the surface. Afterwards, this insulation surface is peeled off at the positions where the terminal electrodes are to be provided by sand blasting, laser trimming, grinding or etching process so as to complete a desired structure of the chip array component admitting to apply fabrication process of forming the terminal electrode soldering interfaces on a chip array component of comparatively lower surface insulation.

Another object of the present invention is to provide an insulated structure of a chip array component which can be fabricated by forming terminal electrode soldering interfaces on an ordinary chip component following the same process and using the same equipment, and to solve the bothersome problem inherent to the prior art that high voltage discharging and leakage current from the surface of a high voltage capacitor element due to the dirts affixed to the granulated surface thereof by entirely coating the structure of the chip array component with a dense insulation material.

Another object of the present invention is to provide an insulated structure of chip array component which can be fabricated of a cheap material of lower surface insulation property by forming the soldering interfaces at the positions where the terminal electrodes to be provided after the entire structure of the chip component is enclosed or coated by the dense insulation material.

Another object of the present invention is to provide a method for fabricating an insulated structure of a chip array component having the advantages described above.

A more complete understanding of these and other features and advantages of the patent invention will become apparent from a careful consideration of the following detailed description of certain embodiments illustrated in the accompanying drawings.

BRIEF DESCRIPTION OF THE DRAWINGS

FIGS. 2A through 2E are the perspective views illustrating the fabrication process of an insulated structure of a chip array component according to the present invention.

DETAILED DESCRIPTION OF THE PREFERRED EMBODIMENTS

Figure 1A:
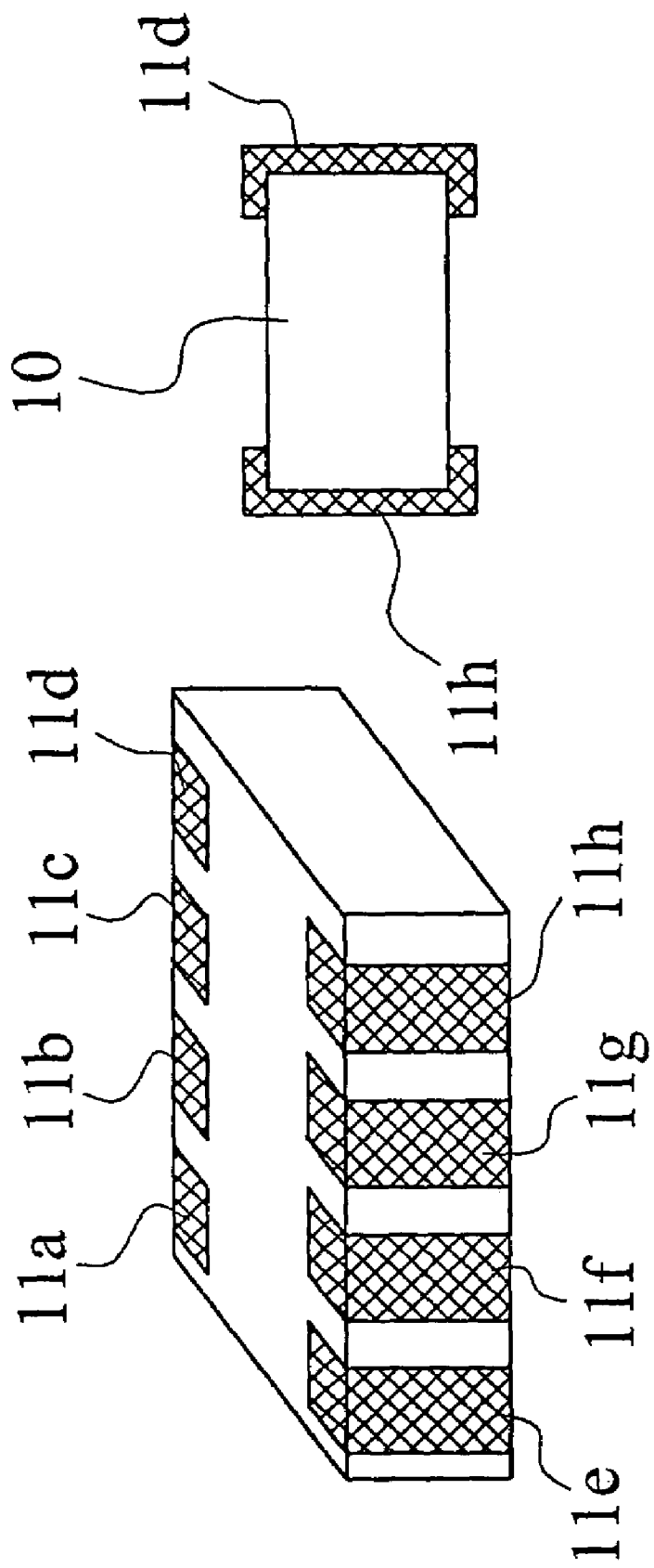
FIGS. 1A and 1B are the perspective views illustrating the fabrication process of a conventional chip array component.
Figure 1B:
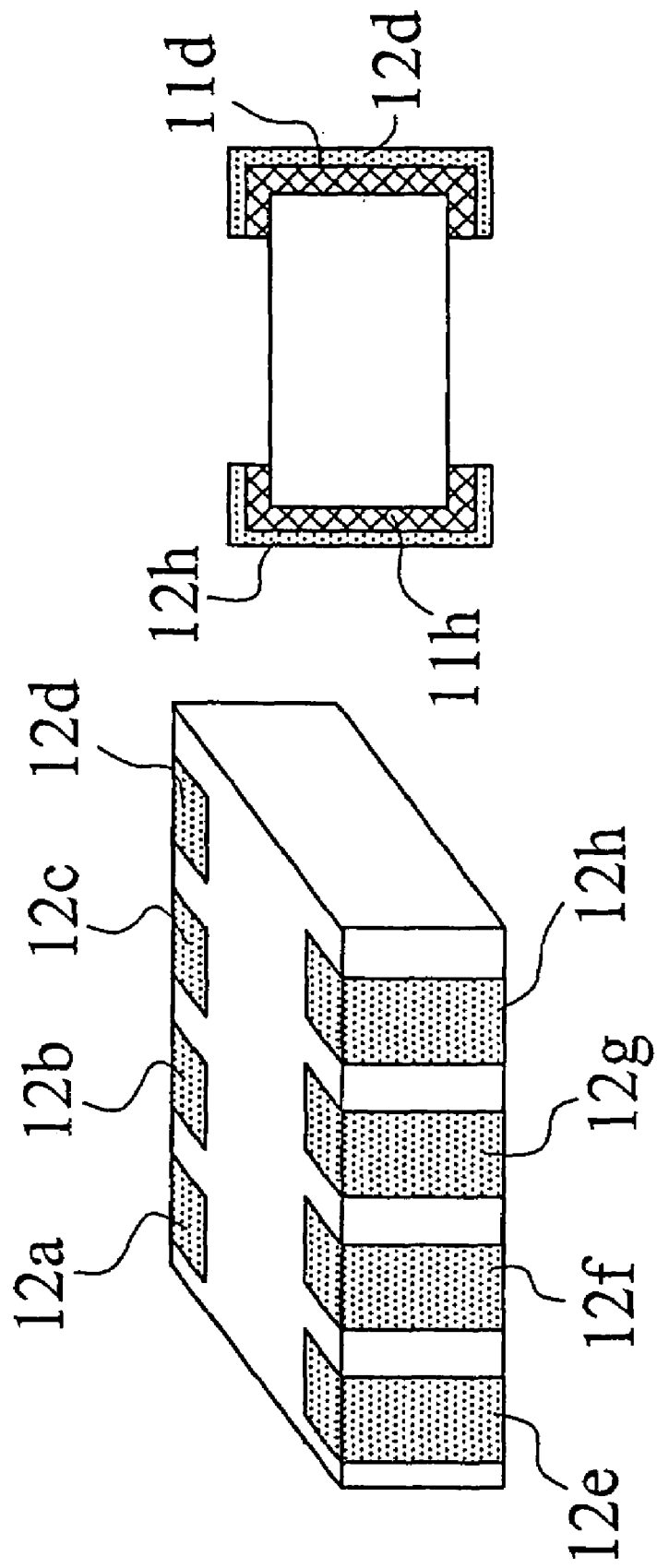
Figure 2A:
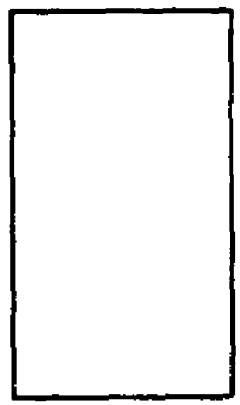
Figure 2A:
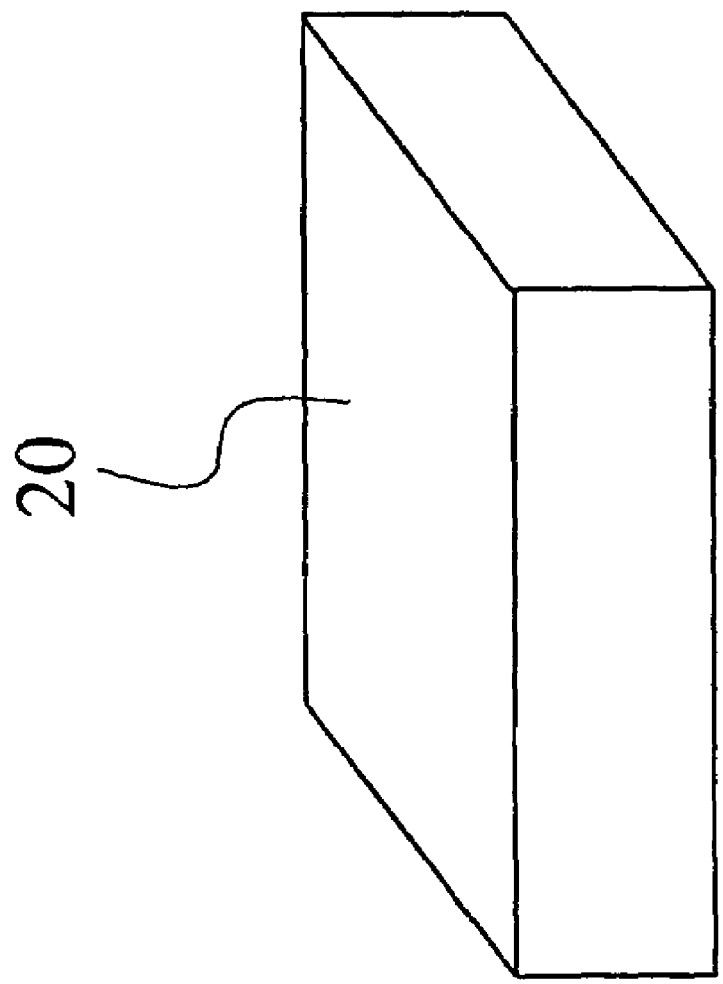
Figure 2B:
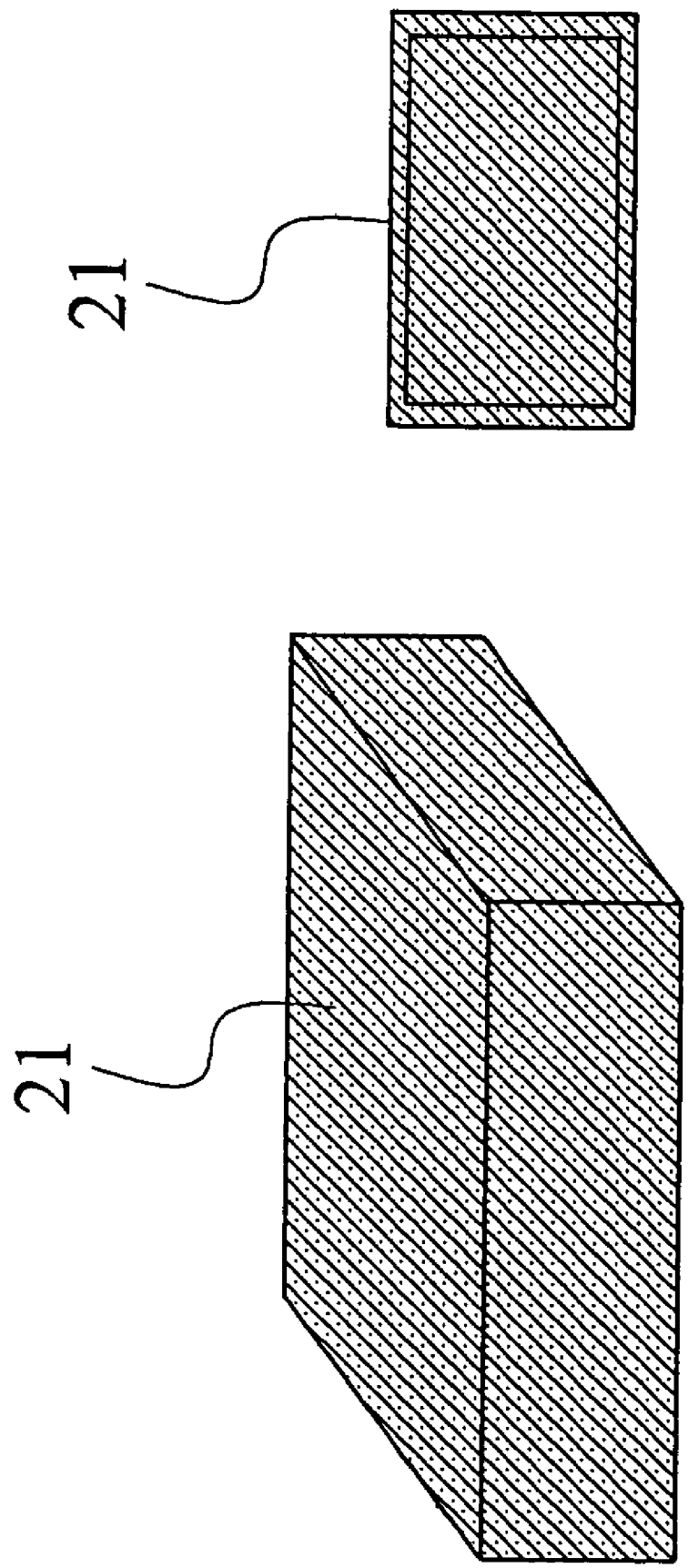
Figure 2C:
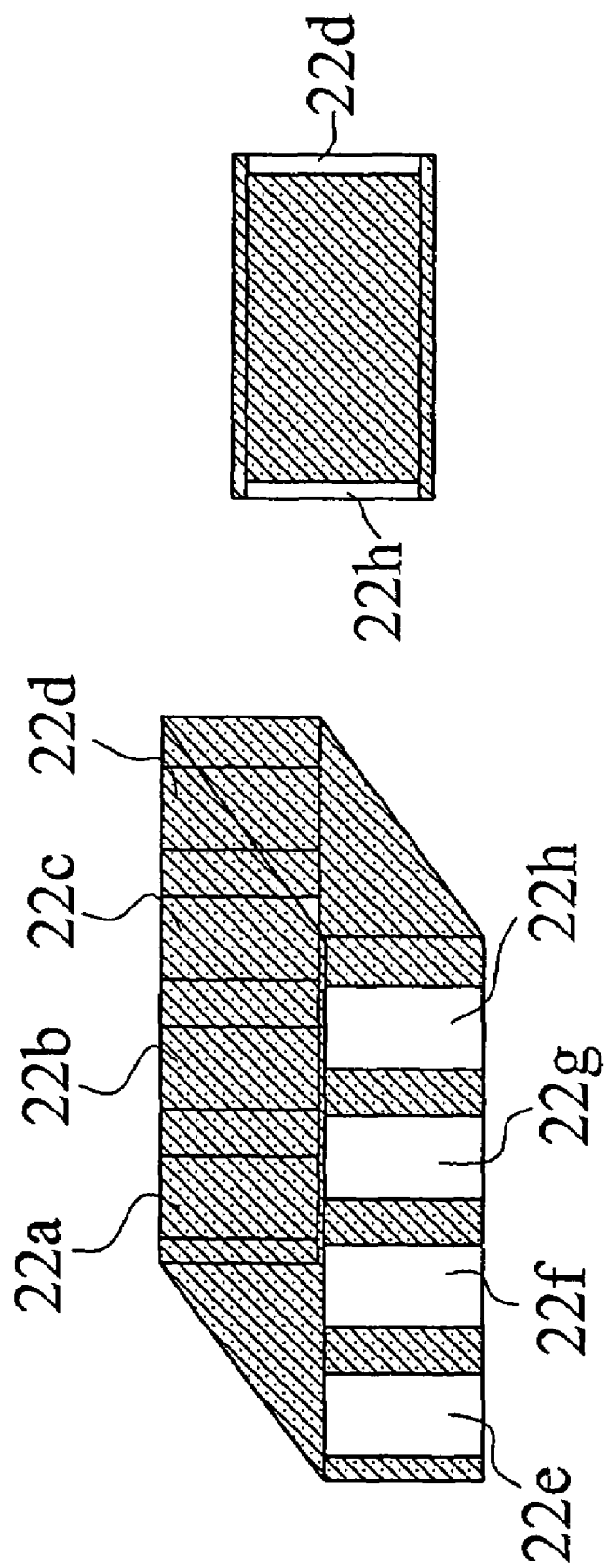
Figure 2D:
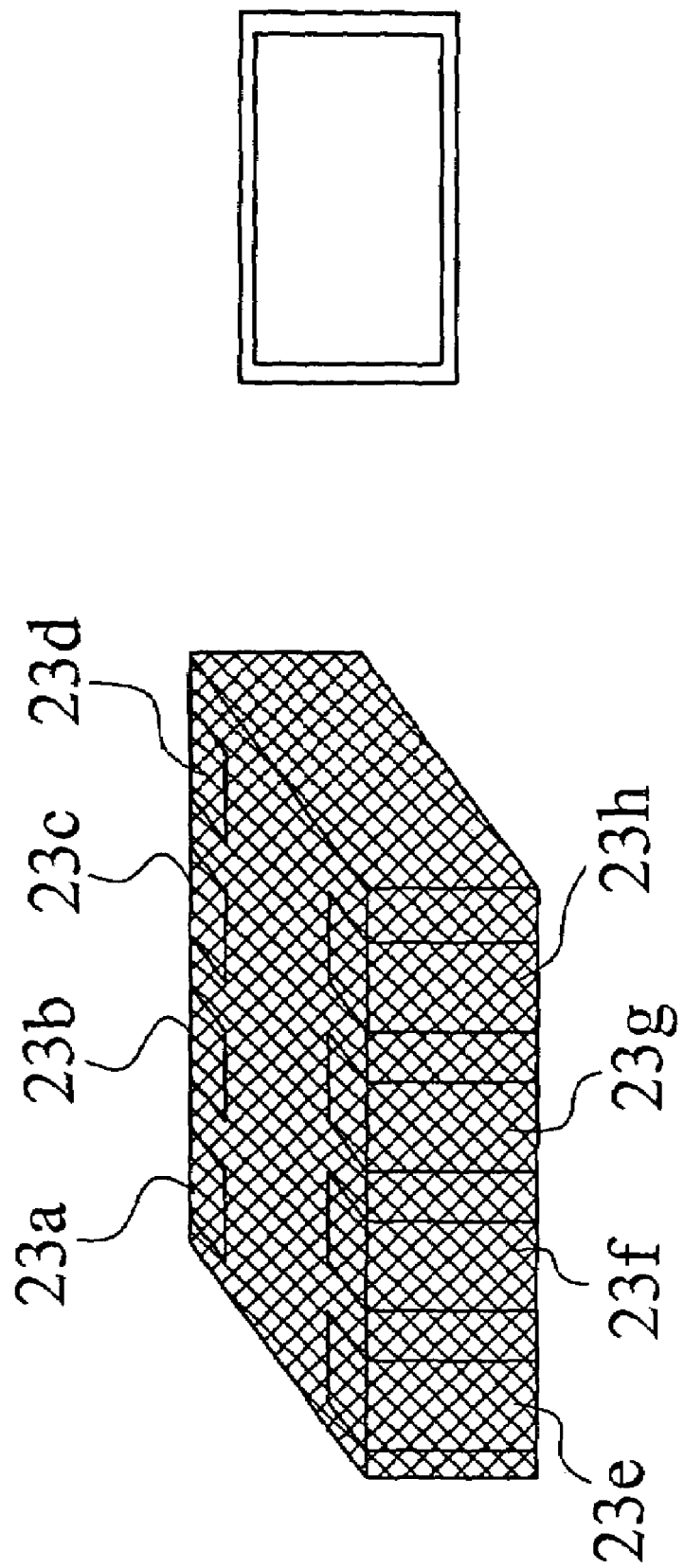

Referring to FIGS. 2A and 2B, the fabrication method of the present invention comprises the steps of:

preparing a main body of a chip array component 20 (please refer to FIG. 2A);

selecting a dense and high surface resistance insulation material 21 to entirely enclose the main body of the chip array component 20 (please refer to FIG. 2B);

removing the high surface insulation resistance material 21 at the positions 22a, 22b, 22c, 22d, 22e, 22f, 22g and 22h where terminal electrodes are to be formed for connection with corresponding outer electrodes by sand blasting, laser trimming, grinding or etching (please refer to FIG. C);

using an ordinary conducting material to form terminal electrodes at the positions 23a, 23b, 23c, 23d, 23e, 23f, 23g and 23h for the chip array component by the fabrication process for the terminal electrode (please refer to FIG. D); and forming soldering interfaces 24a, 24b, 24c, 24d, 24f, 24g and 24h for the terminal electrodes formed at the positions 23a, 23b, 23c, 23d, 23e, 23f, 23g and 23h with an ordinary conducting material by the electro plating process (please refer to FIG. 2E) so as to complete the fabrication of the insulated structure of a chip array component of the present invention.

From the above description in conjunction with the perspective views illustrating the fabrication process shown in FIGS. 2A and 2B, it is clear that the insulated structure of the chip array component fabricated as such has several noteworthy advantages compared with a conventional ones, particularly:

1. That the difficulty in forming the soldering interface for the terminal electrode on a chip array component having relatively low surface insulation is effectively solved by the present invention.

2. That the problem inherent to the prior art that high voltage discharging and leakage of current from the granulated surface of a high voltage capacitor element due to the dirts affixed to the surface thereof is effectively solved by the present invention.

Although the invention has been described in terms of preferred embodiments, it is apparent that numerous variations and modifications may be made without departing from the true spirit and scope thereof, as set forth in the following claims.

What is claimed is:

1. A method of fabricating an insulated structure of a chip array component, comprising:

providing a main body of the chip array component;

coating and enclosing the entire main body of the chip array component with a dense layer of surface insulation resistance material;

removing the surface insulation resistance material from the main body of the chip array component at positions where terminal electrodes are to be formed and exposed by sand blasting, laser trimming, grinding or etching process;

forming terminal electrodes at the positions using conducting material; and, forming soldering interfaces for the terminal electrodes with conducting material by electro plating process.

* * * * *